Jan. 2, 1940.  S. P. TSCHAPPAT  2,185,479
CASING AND TUBING HEAD
Filed May 13, 1937
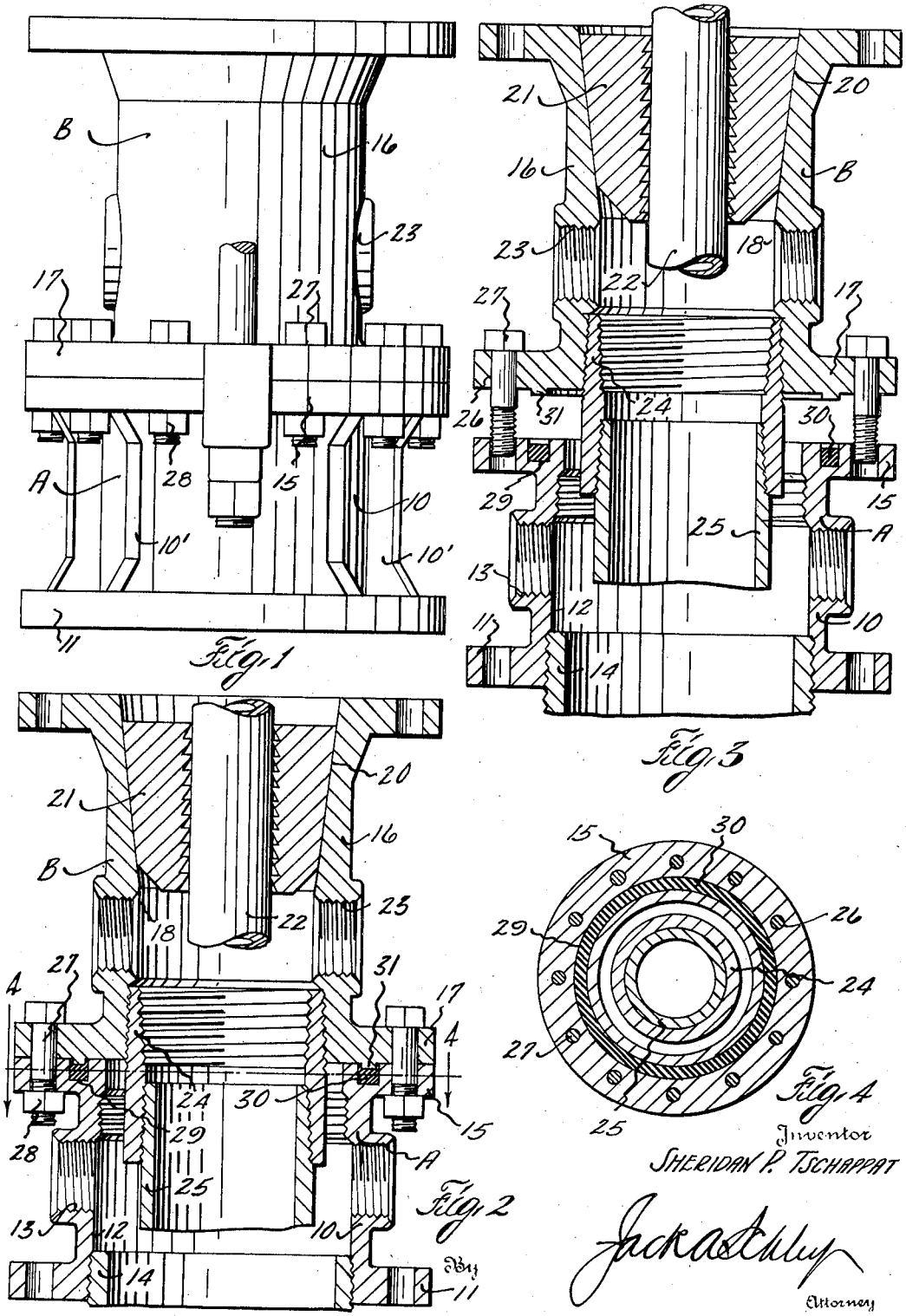
Inventor
SHERIDAN P. TSCHAPPAT
Jack A. Ashley
Attorney Patented Jan. 2, 1940

2,185,479

UNITED STATES PATENT OFFICE 2,185,479

CASING AND TUBING HEAD

Sheridan P. Tschappat, Tulsa, Okla.

Application May 13, 1937, Serial No. 142,351

1 Claim. (Cl. 285—22)

This invention relates to new and useful improvements in casing and tubing heads.

As is well known, it is the custom in oil well production practice to superimpose tubing and casing supports so that a plurality of concentric fluid conduits may be suspended in the well.

It is one object of this invention to provide an improved means for connecting a casing support and a tubing support so that a leak-proof joint is effected therebetween, said connection having certain characteristics making for increased safety and greater ease of assembly, and also permitting the packing at the joint to be replaced without disturbing the well connections or having to lift the casing or its support.

An important object of the invention is to provide improved means for connecting supports together and including an elastic packing element which is adapted to be distorted into sealing position when the supports are secured; the packing being arranged so that when the supports are disconnected, said packing is protected and is not exposed to accidental damage or displacement.

Another object of the invention is to provide an improved connection between two supports which have engaging flanges adapted to be connected together, one of said supports being formed with a recess in which an elastic packing element is disposed, and the other support having a projection in registration with the recess and adapted to engage therein to distort the packing element when the supports are connected together, the packing element having its upper end normally located below the upper end of the recess, whereby said element is protected at all times.

Still another object of the invention is to provide improved means for connecting a tubing support with a vented base member, from which the well casing is suspended, with an improved packing arrangement between the support and member, whereby a fluid-tight joint is had therebetween.

A construction designed to carry out the invention will be hereinafter described, together with other features of the invention.

The invention will be more readily understood from a reading of the following specification and by reference to the accompanying drawing, in which an example of the invention is shown, and wherein:

Figure 1 is an elevation of a base member having a tubing support superimposed thereon and connected thereto in accordance with the invention, Figure 2 is a transverse, vertical sectional view of the same;

Figure 3 is a view similar to Figure 2 with the tubing support disconnected from the base member, and Figure 4 is a reduced horizontal cross-sectional view taken on the line 4—4 of Figure 2.

In the drawing, the letter A designates an annular flanged base member having a tubing support B superimposed thereupon. The base member A includes a cylindrical body or shell 10 having an external annular flange 11 at its lower end, whereby said base member may be connected to a suitable support (not shown). The body has a vertical bore 12 and is provided with internally screw-threaded radial ports or outlets 13 for receiving outlet pipes or conduits (not shown). The bore of the body is provided with internal screw-threads above and below the ports and is adapted to receive the upper end of an outer well casing 14 which is screwed into the lower end thereof. An external annular connecting flange 15 is provided on the upper end of the body 10 so that said body may be connected with the tubing support, as will be explained. External vertical ribs 10' extend between the flanges on the body 10 to strengthen the same.

The tubing support B may be of any suitable type, but for purposes of illustration, a support is shown wherein an elongate tubular housing 16 having an external flange 17 at its lower end, is adapted to rest on the flange 15 of the base member. The housing has a cylindrical bore 18 having a slip bowl 20 formed therein, and the usual slips 21 are mounted in the bowl and gripped above tubing 22 which extends therethrough. The upper end of the tubing support B is flanged to permit the mounting of a valve or other safety device thereabove. The usual internally screw-threaded radial ports 23 are formed in the wall of the housing below the slips for receiving outlet pipes (not shown) for conducting fluid from within the tubing support. The lower end of the bore 18 is internally screw-threaded and receives the upper end of a collar 24. The collar is internally screw-threaded throughout its length whereby the upper end of an inner string of tubing or casing 25 may be suspended therefrom. It is pointed out that the well casing 14, inner casing or tubing 25 and the tubing 22 which is supported by the slips 21 are all concentric and therefore a plurality of fluid conduits is provided.

When the tubing support B is in position on the base member A, the lower flange 17 of said support overlies the upper flange 15 of said base member. The flanges are of substantially the same radial projection and are provided with a plurality of openings 26 which are adapted to register with each other. Bolts 27 extend through the openings 26 in the flanges and receive nuts 28 on their outer ends, whereby the support and the member are securely fastened together.

When the support is in position on the base member, as shown in Figure 2, a leakage of pressure would occur between the flanges 17 and 15 and therefore, some means must be provided for sealing the joint between these flanges. For this purpose, an annular groove or recess 29 which is substantially square in cross-section is provided in the top of the base member and is located nearer the bore 12 of said member. An elastic packing ring or element 30 is inserted in the groove 29 and the height of the packing ring is less than the depth of the groove, whereby when said ring is within said groove, the top of the ring is in a plane below the top of the base member, as is clearly shown in Figure 3. Therefore when the tubing support and the base member are separated, the ring is located within the groove and does not project therefrom. This is an important feature of the invention for obviously with such arrangement, it is impossible to damage the packing ring 30 or to accidentally displace the same from its groove 29.

For distorting the elastic packing ring 30 when the flanges 15 and 17 are drawn together to fasten the support to the member, the underside of the flange 17 is formed with a depending annular rib 31 and the location of this rib is such that when the flanges are drawn together, the rib registers with the annular groove 29 in the top of the base member A. Therefore, when the nuts 28 are tightened on the bolts 27 and the flanges 15 and 17 drawn together, the rib 31 enters the upper end of the groove 29 and engages the top of the packing ring 30 which is located within said groove. The width of the rib 31 is less than the width of the groove 29 so that as said rib engages the top of the ring 30, said ring is distorted upwardly around the sides of the rib 31, as shown in Figure 2, whereby said ring positively seals off the joint between the flanges 15 and 17. The rib is of such size that it will engage the top of the packing ring 30 prior to the engagement of the flanges 15 and 17 with each other, whereby as the faces of the flanges are engaged, the packing ring 30 is simultaneously distorted into its sealing position. Therefore, the packing ring 30 is distorted into sealing position as the connection is made, thereby providing a fluid-tight joint simultaneously with the making up of a positive connection between the base member and the support.

With the above means for connecting the support and member, it is possible to replace the packing ring 30 by merely separating the flanges 15 and 17. The provision of the collar 24 which is externally threaded at its upper end permits the tubing 25 to be supported by a section of pipe screwed into the collar and suspended from the derrick (not shown) while the support B is screwed onto said collar. Further, it would be rather difficult to screw the tubing 25 directly into the bore of the support B and therefore, the collar provides a very simple means for handling the tubing 25 during assembly of the head.

What I claim and desire to secure by Letters Patent is:

In a combination, a short casing head having an outwardly directed annular base flange at its bottom, whereby it may be fastened down upon a rigid support and held against upward displacement, said casing head also having a large cylindrical bore provided with internal screw threads at its lower end for receiving the upper end of an outer well casing, an outwardly directed annular flange at the top of the casing head having bolt holes, said casing head having an outlet from its bore between its flanges, a short tubing head having an outwardly directed annular base flange at its bottom provided with holes and resting flat upon the top flange of the casing head, whereby a low compact structure is provided, and bolts extending through the holes of the head flanges for rigidly fastening the heads together, the tubing head having an axial bore provided with internal screw threads at its lower end for supporting an inner pipe string and an upwardly flared slip bowl at its upper end for receiving slips for supporting a central tubing string, the tubing head having an outlet from its bore between the bowl and the screw threads, the heads providing for suspending an outer casing, an inner pipe string and a central tubing string from closely spaced suspension points.

SHERIDAN P. TSCHAPPAT.